United States Patent [19]

Corrigan

[11] Patent Number: 5,516,344
[45] Date of Patent: May 14, 1996

[54] FUEL CELL POWER PLANT FUEL PROCESSING APPARATUS

[75] Inventor: Thomas J. Corrigan, Vernon, Conn.

[73] Assignee: International Fuel Cells Corporation, South Windsor, Conn.

[21] Appl. No.: 818,933

[22] Filed: Jan. 10, 1992

[51] Int. Cl.$^6$ .................. B01J 8/04; B01J 8/06
[52] U.S. Cl. ............. 48/127.9; 48/94; 422/190; 422/192; 422/193; 422/197; 422/200; 422/218
[58] Field of Search .................. 422/149, 173, 422/187, 188–190, 196–198, 192.3, 200.2, 204, 218, 312; 48/61, 64, 94, 127.1, 127.9, 198.1, 198.7; 429/20, 26

[56] References Cited

U.S. PATENT DOCUMENTS

| | | | |
|---|---|---|---|
| 3,499,797 | 3/1970 | Hooper | 422/197 |
| 3,531,263 | 9/1970 | Sederquist | 48/61 |
| 3,655,448 | 4/1972 | Setzer | 136/86 C |
| 3,909,299 | 9/1975 | Corrigan | 422/188 |
| 4,181,503 | 1/1980 | Lesieur et al. | 48/196 A |
| 4,746,329 | 5/1988 | Christner | 48/61 |
| 4,781,241 | 11/1988 | Misage et al. | 165/1 |
| 4,861,347 | 8/1989 | Szydlowski et al. | 48/61 |
| 4,909,808 | 3/1990 | Voecks | 48/94 |
| 4,921,680 | 5/1990 | Bonk et al. | 422/197 |
| 4,976,747 | 12/1990 | Szydlowski et al. | 48/127.9 |
| 5,110,559 | 5/1992 | Kondo et al. | 422/109 |

Primary Examiner—Robert J. Warden
Assistant Examiner—Robert Carpenter

[57] ABSTRACT

The integrated apparatus includes within a single vessel a plurality of components for processing fuel in a fuel cell plant. Along with the gas reformer is an air preheater for the burner and a plenum for supplying the shift converter. The shift converter is also in the vessel with upstream steam and fuel heat exchangers. The shift converter heat exchanger is also included.

25 Claims, 3 Drawing Sheets

FUEL CELL POWER PLANT FUEL PROCESSING APPARATUS

TECHNICAL FIELD

The invention relates to fuel processing apparatus for a fuel cell power plant and in particular to a integration of several components thereof.

BACKGROUND OF THE INVENTION

Fuel cells generate electric power by reacting hydrogen and oxygen in a fuel cell. Part of a fuel cell power plant is the fuel processing portion wherein hydrogen is generated.

A reformer reacts water and desulfurized hydrocarbon fuel in the presence of a catalyst to generate $H_2CO$ and $CO_2$. A low temperature shift converter reacts water and CO from the reformer producing additional hydrogen.

In the fuel cycle, raw fuel is first preheated for removal of oxygen in an oxidizer and for removal of sulfur in the hydrosulfurizer followed by $H_2S$ removal. This preheat may use reformed gas from the reformer as the heat source.

Saturated steam from the plant accumulator is superheated for mixing with desulfurized fuel. This forms the mix to be supplied to the reactors of the reformer. Superheat of this steam is often accomplished with the heat exchange between the reformer exit gas and the steam.

Reforming the gas in the reactor is carried out in the presence of a catalyst as the product gas is heated by heat exchange with combustion products from a fired burner. Exhaust combustion gas from the reformer heat exchange is used to preheat air for its burner. In low temperature shift converters the catalyst must be maintained at a temperature level between 320° F. and 500° F. In operation, the reaction is exothermic and the hot gas must be cooled prior to and/or in the bed. During plant start-up the bed must be preheated to the minimum temperature.

A plurality of separate components are required for these many operations. A fuel preheat heat exchanger and an air preheat heat exchanger as well as a reformer and a reformed gas cooled heat exchanger is required. Also, a steam superheat heat exchanger is needed. Each unit has a footprint area, extensive outside surface requiring insulation, and connecting piping. The result is a large floor area, high heat loss, and many piping connections to be made as well as much surface to be insulated. Also, because of the high surface area there is a relatively high heat loss to the atmosphere.

SUMMARY OF THE INVENTION

Multiple components of a fuel treatment system are combined within a single containment vessel.

The containment vessel is comprised of a substantially cylindrical shell and has therein a division plate dividing the vessel to an upper gas reformer gas portion and a lower shift converter portion. A burner is arranged to discharge combustion gas into the upper portion which contains a plurality of reactor tubes. These tubes contain catalyst and are located in heat exchange relationship with the combustion gas. They have a process gas flowpath through the reactor tubes.

Combustion gas outlet plenum receives combustion gas after it passes in heat exchange relationship with the reactor tubes. This plenum is located below the reactor tubes and above the division plate. From this plenum, the combustion gas outlet flowpath extends upwardly along the shell. This contains air heater heat exchange surface.

A process gas reactor outlet plenum is located within the vessel below the division plate. The reactor outlet tubes pass from the reactors through the combustion gas outlet plenum, through the division plate, and to the process gas outlet plenum. The reactors are posted on these tubes.

A shift converter is located within the vessel at a lower elevation and it contains a bed of catalyst. It is connected to receive the process gas from the process gas outlet plenum with no external piping. The process gas outlet line is arranged to discharge the process gas from the shift converter and convey it to outside the vessel.

Heat exchangers receiving heat from the process gas leaving the reactors are located in the vessel, one being a steam heating heat exchanger and the other being a fuel heating heat exchanger. These are located prior to the low temperature shift converter bed in order to cool the process gas in route thereto.

A heat exchanger is located at least partially in the shift converter bed, for preheating the bed during startup and for cooling the bed during operation. A portion of the heat exchanger may be located upstream of the bed for further precooling the gas during operation.

DESCRIPTION OF THE PREFERRED EMBODIMENT

Figure 1:
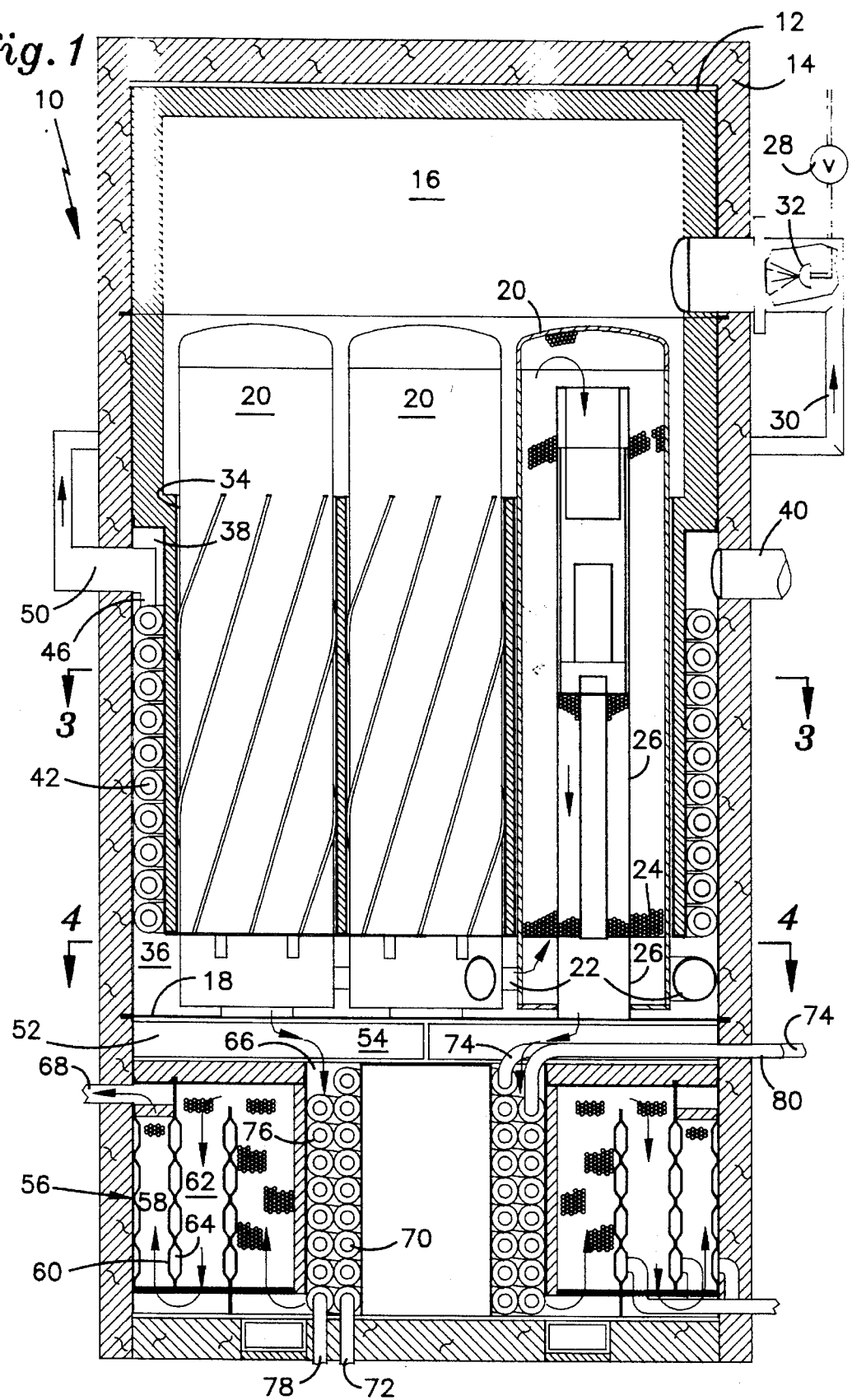
FIG. 1 is a sectional side elevation of the fuel processing apparatus.

The integrated fuel processing apparatus 10 has a containment vessel of shell 12. This is externally insulated with insulation 14.

An upper gas reformer portion 16 is located above division plate 18. A plurality of reactor tubes 20 are located in this upper portion. Each reactor tube contains a catalyst and receives process gas flow through inlet tubes 22. Each reactor is in the form of a bayonet tube with the process gas passing upwardly through catalyst bed 24 and down through the outlet tube 26. This outlet tube is posted on division plate 18 for support of the reactors.

Fuel passing through valve 28 and preheated air 30 enter burner 32 with combustion gas being discharged into the upper gas reformer portion 16. This combustion gas passes through spaces 34 in heat exchange relationship with the reactors. The combustion gas then passes to the combustion gas outlet plenum 36 located below the reactor tubes and then to division plate 18.

A combustion gas outlet flowpath in the form of an annular passage 38 is located adjacent the shell 12 and carries the combustion gas exhaust products to exit by 40.

Figure 2:
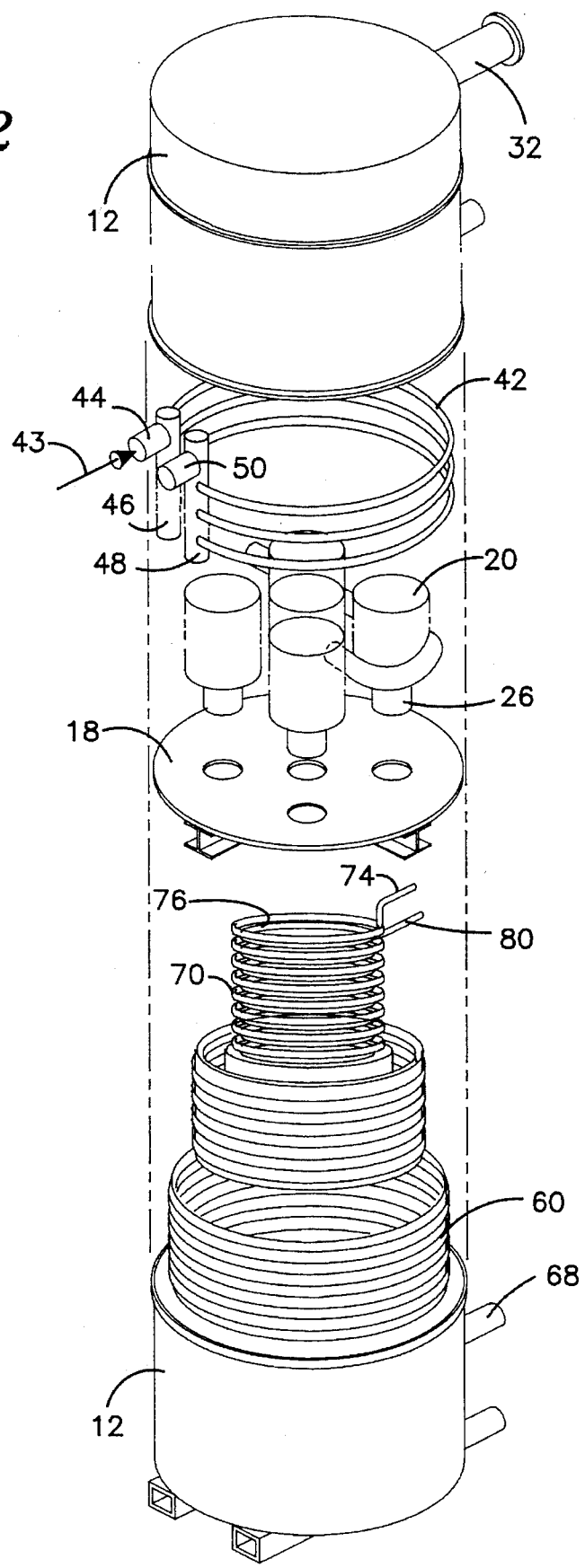
FIG. 2 is an exploded view of the fuel processing apparatus.
Figure 3:
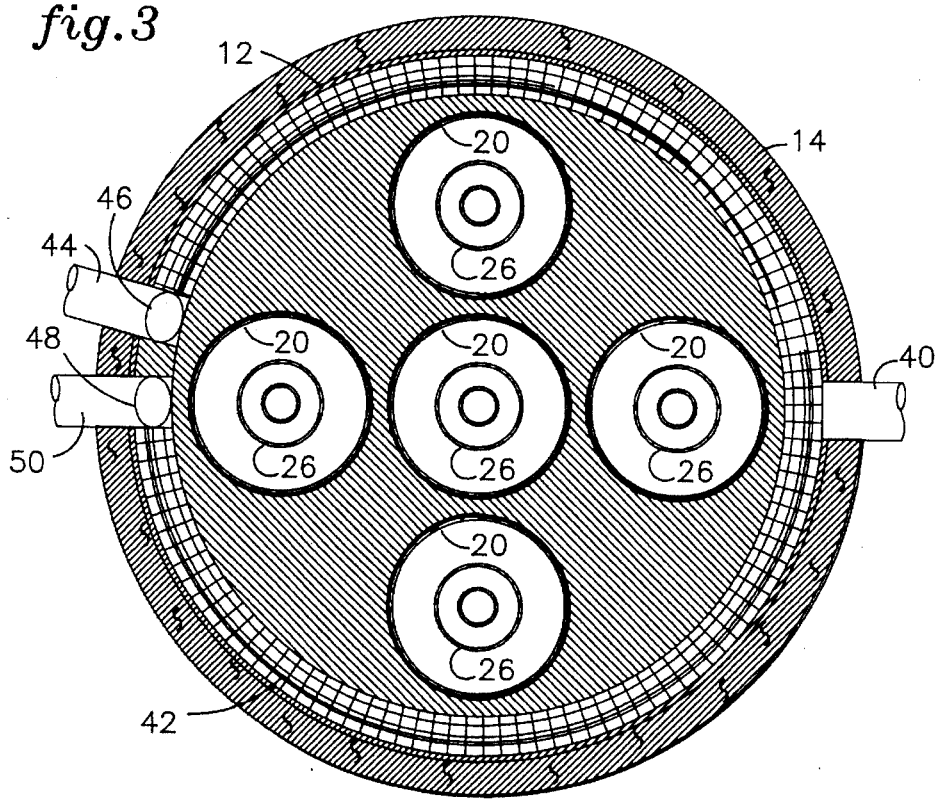
FIG. 3 is a top sectional view taken from section 3—3.
Figure 4:
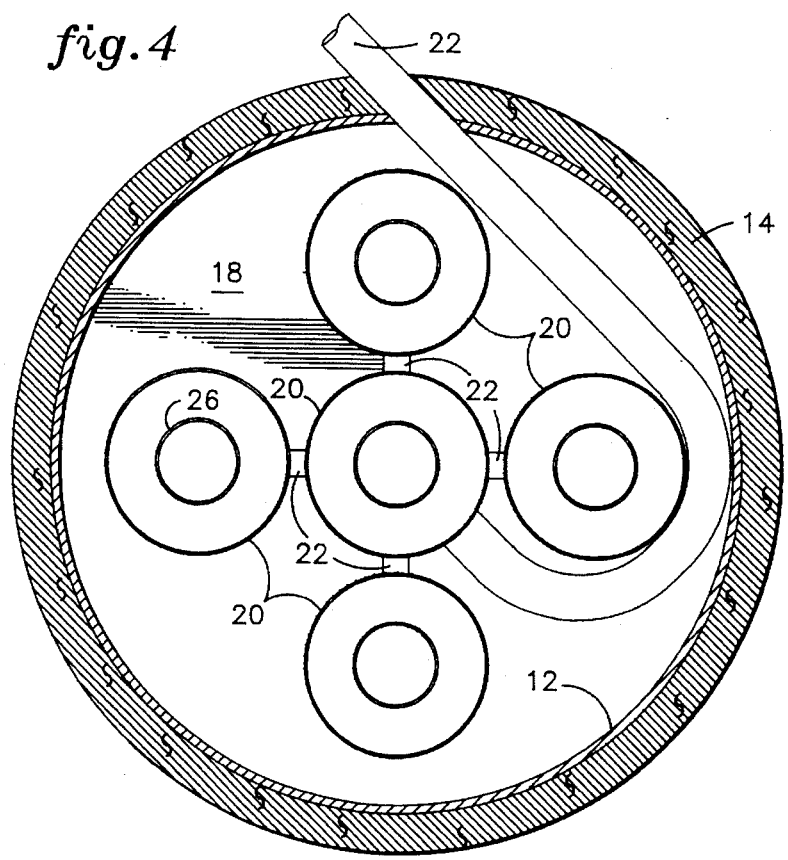
FIG. 4 is a top sectional view taken from section 4—4.

Within this annular passage 38 there is located air heater heat exchange surface 42 in the form of spiral finned tubing. Burner air for the burner assembly 32 is preheated here with the air supply 43 entering through inlet pipe 44 to a vertical inlet header 46. It passes through parallel flow tubes of air heater heat exchange surface 42 circumferentially around the vessel exiting through outlet header 48 and outlet pipe 50 (FIG. 2). It passes from here to pipe 30 to the burner assembly.

Immediately below the division plate 18 is located a process gas outlet plenum 52 with process gas being discharged into this plenum through reactor outlet tubes 26. The portion of the containment vessel below the division plate 18 is the lower shift converter portion 54. Within this portion there is located a low temperature shift converter 56 having a bed of catalyst 58. Annular vertical baffles 60 are located within the bed providing a sinuous flowpath 62 through the bed. Flow passages 64 are located inside these baffles to permit cooling or heating of the bed as required. Gas flow from the plenum 52 passes downwardly through an annular vertical duct 66 to the bottom of the shift converter and passing through the sinuous path to process gas outlet 68.

Located within this annular vertical duct 66 are two heat exchangers. Each heat exchanger is shown here as a spiral wound fin tube. Heat exchanger 70 is steam superheating surface receiving steam from the plant accumulator and superheating it for mixing with the gas to be reformed. The steam enters through steam inlet pipe 72 exiting through steam outlet pipe 74.

The other heat exchanger 76 is a fuel preheating fuel exchanger with the fuel to be processed entering through fuel inlet 78 and exiting through fuel outlet line 80. This preheated fuel passes to the hydrodesulfurizer for sulfur removal and is then mixed in proper proportions with the steam for entry to the reactor tubes of the gas reformer.

The combustion gas flow through the lower shift converter portion of the vessel is shown in FIG. 1 as a vertical sinuous path across the two heat exchangers 70, 76 and through the low temperature shift converter 56.

Rather than using the baffles 60 as heat exchange surface, separate heat exchange surface could be located in the bed. This is used to cool the bed during operation and to preheat the bed for startup. Furthermore, a portion of this heat exchange surface could be located in heat exchange relationship with the gas upstream of the catalyst bed for the purpose of further cooling gases before they enter the bed.

Within the integrated fuel processing assembly there is included the reformer, reformer burner, burner air preheater, the heat exchangers upstream of the low temperature shift converter and the low temperature shift converter. Compared to the multiple separate assemblies, this provides a lower cost, smaller power plant footprint, and a volumetric decrease. It also decreases the external piping and lowers heat loss. The decrease in external piping leads to fewer piece parts, lower cost installation, and lower pressure drop.

I claim:

1. An integrated fuel processing apparatus for a fuel cell power plant comprising:

a containment vessel in the shape of a substantially cylindrical shell;

a division plate dividing said containment vessel into an upper gas reformer portion and a lower shift converter portion;

a burner arranged to discharge combustion gas into said upper portion;

a plurality of reactor tubes containing catalyst and located in heat exchange relationship with said combustion gas;

a process gas flowpath through said reactor tubes;

a combustion gas outlet plenum located for receiving combustion gas after the heat exchange relationship with said reactor tubes, and furthermore located below said reactor tubes and above said division plate;

a combustion gas outlet for fluidly connecting said combustion gas outlet plenum to the exterior of said vessel;

a process gas reactor outlet plenum located within said vessel below said division plate;

reactor outlet tubes passing from said reactor tubes through said combustion gas outlet plenum, said division plate, and to said process gas outlet plenum;

a shift converter within said vessel, containing a bed of catalyst and connected to receive process gas from said process gas outlet plenum; and a process gas outlet line arranged to receive process gas from said shift converter and convey it to the exterior of said vessel.

2. An apparatus as in claim 1 further comprising:

an air heater heat exchanger located in said combustion gas outlet flowpath;

an air supply to said air heater heat exchanger; and means for conveying air from said air heater heat exchanger to said burner.

3. An apparatus as in claim 1 further comprising:

a steam heat exchanger interposed between said process gas outlet plenum and said shift converter; and means for conveying steam from said steam heat exchanger to said process gas flowpath at a location upstream of said reactor tubes with respect to the process gas flow.

4. An apparatus as in claim 1 further comprising:

a fuel heat exchanger interposed between said process gas outlet plenum and said shift converter; and means for conveying fuel from said fuel heat exchanger to said process gas flowpath upstream of said reactor tube.

5. An apparatus as in claim 1 further comprising:

heat exchange surface located at least partially in said bed of catalyst contained by said shift converter.

6. An apparatus as in claim 1 further comprising:

said plurality of reactor tubes comprising a plurality of bayonet tubes posted on the outlet tube of each bayonet tube from said division plate.

7. An apparatus as in claim 2 further comprising:

said combustion gas outlet flowpath comprising an annular passage adjacent said shell extending upwardly from said combustion gas outlet plenum; and a combustion gas exit pipe at a location of said annular passage passing through said shell.

8. An apparatus as in claim 7 further comprising: said air heater heat exchanger located in said annular passage.

9. An apparatus as in claim 8 further comprising: said air heater heat exchanger comprised of a vertical supply header, a vertical discharge header, and a plurality of finned tubes in parallel flow relationship, each passing circumferentially through said annular passage from said supply header to said discharge header.

10. An apparatus as in claim 1 further comprising:

said bed of catalyst comprising an annular catalyst bed, and a plurality of annular vertical baffles forming a sinuous flowpath through said bed.

11. An apparatus as in claim 10 further comprising:

said vertical baffles comprised of heat exchange surface, said vertical baffles having a fluid passage therethrough for heating or cooling said catalyst bed.

12. An apparatus as in claim 10 further comprising:

an annular vertical duct adjacent said shift converter and fluidly connecting said process gas reactor outlet plenum and said shift converter; and further heat exchanger located in said duct; and means for passing fuel and steam through said further heat exchanger for delivery as process gas to said plurality of reactor tubes.

13. An apparatus as in claim 12 further comprising:
said annular vertical duct located radially inwardly of said annular bed of catalyst.

14. An apparatus as in claim 2 further comprising:
a steam heat exchanger interposed between said process gas outlet plenum and said shift converter; and
means for conveying steam from said steam heat exchanger to said process gas flowpath at a location upstream of said reactor tubes with respect to the process gas flow.

15. An apparatus as in claim 14 further comprising:
a fuel heat exchanger interposed between said process gas outlet plenum and said shift converter; and
means for conveying fuel from said fuel heat exchanger to said process gas flow path upstream of said reactor tube with respect to the process gas flow.

16. An apparatus as in claim 15 further comprising:
heat exchange surface located at least partially in said low temperature shift converter bed.

17. An apparatus as in claim 16 further comprising:
said plurality of reactor tubes comprising a plurality of bayonet tubes posted on the outlet tube of each bayonet tube from said division plate.

18. An apparatus as in claim 17 further comprising:
said combustion gas outlet flowpath comprising an annular passage adjacent said shell extending upwardly from said combustion gas outlet plenum; and
a combustion gas exit pipe at a location of said annular passage passing through said shell.

19. An apparatus as in claim 18 further comprising:
said air heater heat exchanger located in said annular passage.

20. An apparatus as in claim 19 further comprising:
said air heater heat exchanger comprised of a vertical supply header, a vertical discharge header, and a plurality of finned tubes in parallel flow relationship, each passing circumferentially through said annular passage from said supply header to said discharge header.

21. An apparatus as in claim 16 further comprising:
said bed of catalyst comprising an annular catalyst bed and a plurality of annular vertical baffles forming a sinuous flowpath through said bed.

22. An apparatus as in claim 16 further comprising:
an annular vertical duct adjacent said shift converter and fluidly connecting said plenum and said shift converter; and further heat exchanger surface located in said duct; and
means for passing fuel and steam through said further heat exchange surface for delivery as process gas to said reactors.

23. An apparatus as in claim 22 further comprising:
said annular vertical duct located radially inwardly of said annular bed of catalyst.

24. An apparatus as in claim 20 further comprising:
an annular vertical duct adjacent said shift converter and fluidly connecting said plenum and said shift converter; and further heat exchanger surface located in said duct; and
means for passing fuel and steam through said further heat exchange surface for delivery as process gas to said reactors.

25. An apparatus as in claim 24 further comprising:
said annular vertical duct located radially inwardly of said annular bed of catalyst.

* * * * *